United States Patent [19]

Bray et al.

[11] Patent Number: 4,577,490
[45] Date of Patent: Mar. 25, 1986

[54] DETECTING LEAKS

[75] Inventors: David J. Bray, Bromsgrove; Peter E. Johnson, Redditch; Peter E. G. Marshall, Stratford on Avon; Francis R. Piper, Evesham; Iain H. Murdoch, Meriden, all of United Kingdom

[73] Assignee: BL Technology Limited, England

[21] Appl. No.: 647,547

[22] Filed: Sep. 6, 1984

[30] Foreign Application Priority Data

Sep. 7, 1983 [GB] United Kingdom ............... 8323997

[51] Int. Cl.⁴ .................................. G01M 3/20
[52] U.S. Cl. .................... 73/40.7; 73/864.33
[58] Field of Search ............ 73/40.7, 37.5, 864.33

[56] References Cited

U.S. PATENT DOCUMENTS

| | | | |
|---|---|---|---|
| 3,067,619 | 12/1962 | Fielding | 73/864.33 |
| 3,362,141 | 1/1968 | Royster, Jr. et al. | 73/864.33 X |
| 4,477,986 | 10/1984 | Marshall et al. | 73/40.7 |
| 4,478,096 | 10/1984 | Heiland et al. | 73/40.7 X |

FOREIGN PATENT DOCUMENTS

| | | | |
|---|---|---|---|
| 2133892 | 8/1984 | United Kingdom | 73/40.7 |
| 417638 | 8/1974 | U.S.S.R. | 73/864.33 |
| 560151 | 2/1977 | U.S.S.R. | |
| 894383 | 12/1981 | U.S.S.R. | 73/40.7 |

OTHER PUBLICATIONS

Rogal, V. F. et al., *Jet Probe of a Halide Leak Detector.* In Instrum. & Exp. Tech., vol. 19(6), pp. 1734–1736, Publ. Jun. 1977.

*Primary Examiner*—Stewart J. Levy
*Assistant Examiner*—Joseph W. Roskos
*Attorney, Agent, or Firm*—Thomas J. Greer, Jr.

[57] ABSTRACT

A leak detector comprises a detector head which is to be scanned across a surface to detect a signal gas eminating from the surface. The opposite side of the surface from the head is supplied with a signal gas under pressure so that signal gas passes through leaks in the surface. Detection of signal gas by the head should then constitute detection of a leak. A curtain 1 of barrier gas is provided around a sample inlet 2 to protect the inlet from spurious signal gas. Orifices 36 provide narrow high velocity jets 38 which impinge on the surface S within curtain 1 and break up jets such as 34 of signal gas which escape under the curtain 1 without allowing the signal gas to reach the sample inlet.

10 Claims, 1 Drawing Figure

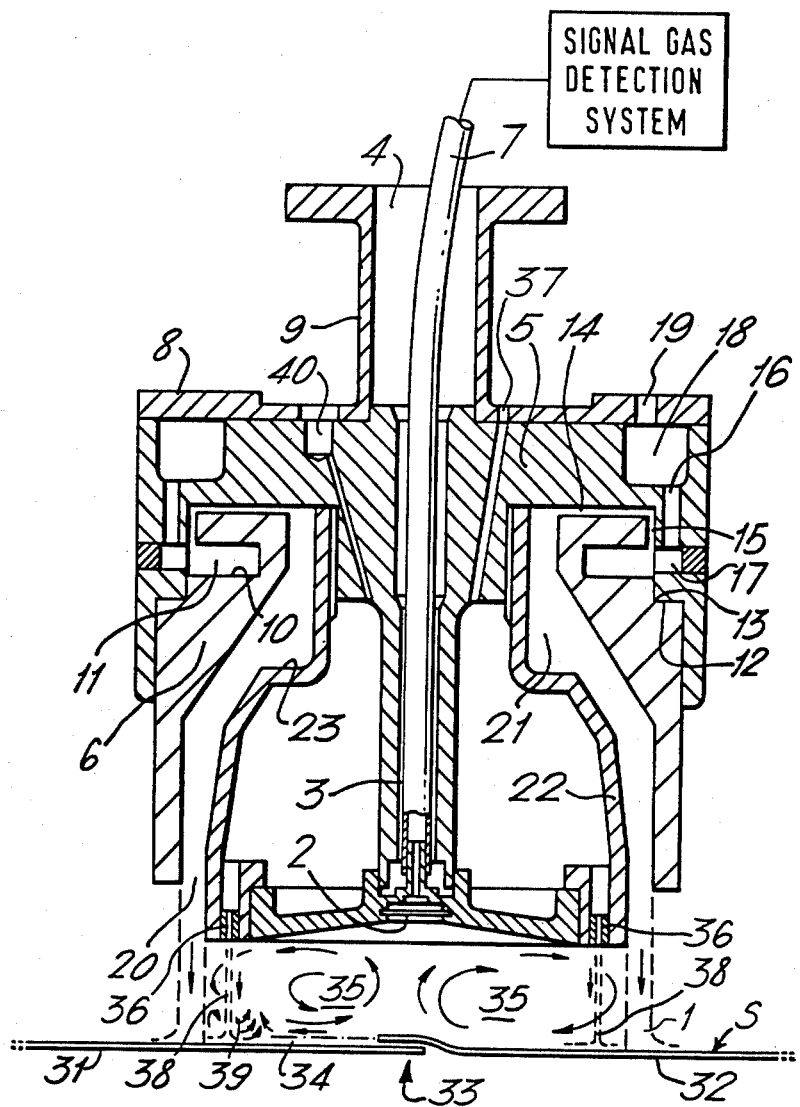

DETECTING LEAKS

The invention relates to detecting leaks and particularly to a method of and apparatus for detection of a signal gas passing through a surface. The surface may be a motor vehicle body internally pressurised above ambient by a signal gas constituted by a mixture of helium and air. The leak detection may be concentrated on or confined to door and window seals and joints between sheets of material which make up the body.

It is essential for the detector to respond to a signal eminating directly from a leak but for it not to respond to spurious concentrations of signal gas which may be present in the atmosphere or may have originated from leaks in parts of the body which are not at the instant concerned being scanned. The position of a detector head when signal gas is detected is then a representation of the position of the leak.

It has already been proposed, for example in our co-pending UK Patent Application No. 83 01407 (Publication No. 2133892), to provided an annular opening surrounding a gas sample inlet and to direct a barrier gas through the opening to provide a gas curtain around the inlet to protect the inlet from signal gas other than that originating directly from a leak in the surface. Air is a convenient barrier gas. Throughout this specification and in the claims the term barrier gas is used generally to refer to a gas which behaves neutrally in relation to the signal gas and does not interfere with the detection of signal gas. When the barrier gas is air and the signal gas is an air-helium mixture, the detector is set so that it does not respond to the level of helium normally present in air.

One effect of the curtain is to produce a flow pattern in the form of a toroidal vortex within the area bounded by the probe, the curtain and the surface. Typical leaks enter this vortex flow, provide a significant concentration of signal gas within the vortex and result in detection of signal gas by the head. Some leaks such as leaks from lap joints between two steel sheet panels can run along the surface of one of the panels in such a way that they remain attached to the panel surface.

According to one aspect of the present invention there is provided a leak detector comprising a detector head for scanning a surface for detection of escape of signal gas through the surface, the head comprising a sample inlet, an annular opening surrounding the inlet, means for directing a barrier gas through the annular opening to provide a gas curtain around the inlet and a plurality of orifices within the area enclosed by the curtain for providing gas jets to impinge on the surface. When the gas jets intecept signal gas flowing along or close to the surface they break up the flow of signal gas and cause signal gas to be mixed with other gas within the volume bounded by the curtain so that the signal gas is detected.

Preferably the orifices are arranged to provide flow parallel to the axis of the dectector head. However, the orifices may be inclined to the axis of the detector head.

Preferably the orifices are spaced out in a ring and lie adjacent to the curtain.

According to a second aspect of the invention there is provided a method of detecting leaks though a surface including the steps of pressurising one side of the surface with a signal gas so that the signal gas passes through leaks in the surface, scanning the other side of the surface with a signal gas detector head, surrounding the head with a curtain of barrier gas flowing towards the surface and directing jets of a barrier gas at the surface within the area bounded by the curtain.

An embodiment of the invention will now be described by way of example with reference to the accompanying drawing which is a diagrammatic cross-section through a detector head of a leak detector according to the invention.

A curtain of barrier gas 1 surrounds a gas sample inlet 2 in the end of a detector head, connected by a flexible hose 7, running through passages 3 and 4, to a detection system for the signal gas. The head is arranged to scan a surface S for the presence of leaks. The under-side (as shown) of the surface S is pressurised with a signal gas so that signal gas passes through leaks in the surface. The barrier gas is air and the signal gas is air to which a small amount of helium has been added, and a mass spectrometer is used in the detection system for detecting the helium. Other signal gasses and barrier gasses can of course be used.

The leak detector shown in the drawing comprises a body 5 to which a sleeve 6 is secured. The top of the body 5 is closed by means of an end plate 8 which is integral with a tube 9 which defines the passage 4.

The sleeve 6 has a square sectioned groove 10 cut out from it, which extends all the way around the circumference of the sleeve, and defines a first annular chamber 11.

The distance between the top of the sleeve 6 and the adjacent surface of the body 5 is carefully controlled by means of abutting surfaces 12 on the sleeve and 13 on the body in order to define a circumferential orifice 14 which communicates via annular passage 15 with the first annular chamber 11.

Barrier gas is fed into the first annular chamber 11 by means of right angled drillings 16, 17 in the body, four of which are evenly spaced around the circumference of the body and communicate with a square sectioned groove which defines a second annular chamber 18 in the top face of the body. Inlet 19 connects to a source of compressed gas.

The purpose of the orifice 14 and of the tortuous path which the barrier gas must take before it reaches the orifice 14 is to ensure that barrier gas emerging from the orifice 14 enters an annular duct 21 with an equal mass flow rate around the entire circumference of the annular duct 21.

It will be noted that in order to pass from the second annular chamber 18 to the annular orifice 14 the barrier gas has to pass through drilling 16, turn a right angle into drilling 17, a further right angle into passage 15 and a further ring angle into orifice 14. Finally, the gas stream emerging from orifice 14 projects directly onto a cylindrical wall normal to the gas flow.

The second annular chamber 18 acts like a manifold to distribute pressure equally amongst the drillings 16 so that barrier gas is fed at equal pressure along all points to the inlet ports of first annular chamber 11. Chamber 11 acts as a reservoir and helps to distribute air evenly around the inlet passage 15 to orifice 14.

After passing through the orifice 14, the barrier gas passes down the annular duct 21 the outer wall of which is defined by the sleeve 6 and the inner wall of which is defined by means of a hollow insert 22. The duct 21 is symmetrical about the axis of the detector, that is, the shape of the duct can be generated by an axial section of the duct when swept in a circle about the axis of the detector. The outer surface of the duct 21 has a frusto-conical portion with a semi-angle of approximately 30° and the inner surface of the duct over this region has a shoulder 23. Lower down the outer surface of the duct 21 is cylindrical and over this region the inner surface is frusto-conical with a semi-angle of around 5° to 10°. The surfaces of the duct are smooth.

The configuration of the duct 21 is such as to produce substantially laminar flow from a circular opening 20 even though the flow immediately after the orifice 14 is turbulent. Laminar flow means that at any point around the circumference of opening 21, the velocity profile across the width of the curtain is always positive and reduces gradually from the centre of the curtain to the sides.

Because equal mass flow rate enters the duct around its circumference, the velocity profile is also substantially the same around the entire circumference of the curtain. Consequently the curtain has no weak points or local disturbances in it and is of equal strength around its circumference.

It has been found that the shoulder 23, which forms a region of locally increased diameter of the duct 21, is important in producing the desired laminar flow.

The tapering of the duct 21 has the effect of allowing a shorter duct to be used than would otherwise be needed to generate laminar flow.

Typical dimensions are as follows: diameter of curtain, 100 millimeters; axial length of the duct 21, 100 millimeters; width of orifice 14, between 0.25 and 1.25 millimeters; width of curtain, between 2 and 4 millimeters. The operating height of the detector from surface S is 2 to 25 millimeters.

The compressed air supply may be in the region of 0.3 to 1.3 bar. Lower pressures could be used if the air is conducted along larger diameter tubes. The gas inlet 2 and flexible hose assembly is evacuated by an auxiliary pump (not shown), which ensures rapid transfer of the signal gas when present into the analyser for detection by the mass spectrometer. The system detects helium quantities in the range $10^{-7}$ to $10^{-8}$ millibar liters per second. It is possible that results could be achieved without the auxiliary pump because the pressure within the curtain 1 is slightly in excess of atmospheric due to the effect of the barrier gas defining a closed volume with the surface S to be tested but the response would be considerably slower.

The part of the surface S shown in the drawing is constituted by two sheet steel members 31 and 32 which overlap each other and are welded together at 33. The joint between panels 31 and 32 is an area of the surface which is to be scanned with a view to detecting a leak. The drawing shows a leak in the form of a jet 34 which runs parallel to and may be attached to the surface of panel 31. The drawing also shows by means of arrows, torodial vortex 35 which is generated by virtue of the curtain 1. The vortex tends to direct signal gas in the volume bounded by the curtain 1 and panel S towards the inlet 2. However, with the detector as thus far described, there is a possibility that the jet 34 attached to surface 31 and due to its substantial velocity would pass under the vortex 35 and out beyond the curtain 1. For this reason it would be possible for the detector as thus far described to fail to detect signal gas escaping through the surface S in the form of a jet in contact with or close to this surface.

In accordance with the present invention, the detector is provided with narrow orifices 36 which are pressurised from a supply of air or other barrier gas from the interior of hollow insert 22 from an inlet 37. A pressure tapping 40 allows the pressure supply to the orifices 22 to be monitored. Orifices 36 produce very fine high velocity jets 38 which pass thorough the vortex 35. When one of the jets 38 impinges on a jet of signal gas such as the jet 34, turbulence is created and this turbulence breaks up the jet 34 so that signal gas in this jet is mixed with the vortex 35 and is detected at the inlet 1.

In a typical example as shown, with eight equally spaced jets 38 extending parallel to the axis of the detector head the pressure applied to the jets is between 0.03 bar and 0.5 bar, the diameter of orifices 36 is between 0.1 millimeter and 1 millimeter preferably 0.5 millimeter.

It is not necessary for the orifices 36 to extend axially and they could be inclined either inwardly or outwardly or at angles which vary from one orifice to the next. It is invisaged that the inclination should lie between 30° from the position shown in an outward direction to 60° from the position shown in an inward direction and between +30° and −30° circumferentially. There should be at least four orifices 36 and eight equally spaced orifices are preferred. The length of each orifice should be at least equal to its diameter and preferably several times its diameter in order to provide a well directed jet.

We claim:

1. A leak detector comprising a detector head for scanning a surface for detection of escape of signal gas through the surface, the head comprising a sample inlet, an annular opening surrounding the inlet, means for directing a barrier gas through the annular opening to provide a gas curtain around the inlet and a plurality of orifices within the area enclosed by the curtain for providing gas jets to impinge on the surface.

2. A leak detector as claimed in claim 1 wherein the orifices are arranged to provide a flow parallel to the axis of the detector head.

3. A leak detector as claimed in claim 1 wherein the orifices are inclined to the axis of the detector head.

4. A leak detector as claimed in claim 3 wherein the said inclination is not greater than 15°.

5. A leak detector as claimed in claim 1 wherein the orifices are spaced out in a ring and lie adjacent to the curtain.

6. A leak detector as claimed in claim 5 wherein there are at least four orifices.

7. A leak detector as claimed in claim 1 wherein the velocity of the jets is greater than the velocity of the curtain.

8. A leak detector as claimed in claim 1 wherein the diameter of each orifices lies within the range of 0.1 to 1.0 millimeters.

9. A method of detecting leaks through a surface including the steps of pressurising one side of the surface with a signal gas, so that signal gas passes though leaks in the surface, scanning the other side of the surface with a signal gas detector head, surrounding the head with a curtain of barrier gas flowing towards the surface and directing jets of a barrier base at the surface within the area bounded by the curtain.

10. A method of detecting leaks as claimed in claim 9 wherein the jets are directed at the surface close to the curtain.

* * * * *